United States Patent
Böke et al.

(10) Patent No.: US 9,488,228 B2
(45) Date of Patent: Nov. 8, 2016

(54) BEARING ARRANGEMENT FOR A STEERING SHAFT

(71) Applicant: Rollax GmbH & Co. KG, Bad Salzuflen (DE)

(72) Inventors: Heike Böke, Bad Oeynhausen (DE); Andreas Sommer, Barntrup (DE)

(73) Assignee: Rollax GmbH & Co. KG, Bad Salzuflen (DE)

( * ) Notice: Subject to any disclaimer, the term of this patent is extended or adjusted under 35 U.S.C. 154(b) by 0 days.

(21) Appl. No.: 14/651,724

(22) PCT Filed: Jan. 15, 2014

(86) PCT No.: PCT/EP2014/050740
§ 371 (c)(1),
(2) Date: Jun. 12, 2015

(87) PCT Pub. No.: WO2014/114543
PCT Pub. Date: Jul. 31, 2014

(65) Prior Publication Data
US 2015/0316105 A1    Nov. 5, 2015

(30) Foreign Application Priority Data
Jan. 28, 2013   (DE) .................... 20 2013 100 373 U

(51) Int. Cl.
*F16C 35/02*    (2006.01)
*B62D 1/16*    (2006.01)

(52) U.S. Cl.
CPC ................. *F16C 35/02* (2013.01); *B62D 1/16* (2013.01)

(58) Field of Classification Search
CPC .... F16C 35/02; F16C 27/006; F16C 35/077; B62D 1/16; Y10T 74/20256
USPC ........ 384/428, 438, 490, 440, 441, 536–536, 384/582; 74/492
See application file for complete search history.

(56) References Cited

U.S. PATENT DOCUMENTS

| | | | | |
|---|---|---|---|---|
| 2,155,064 A | * | 4/1939 | Sandberg | B60R 25/02142 70/185 |
| 3,786,288 A | * | 1/1974 | Joannou | G11B 19/2018 310/68 R |
| 4,185,880 A | | 1/1980 | Shiomi et al. | |
| 4,424,721 A | * | 1/1984 | Deacon | B62D 1/184 403/108 |

(Continued)

FOREIGN PATENT DOCUMENTS

| | | | |
|---|---|---|---|
| CN | 103395442 A | * | 11/2013 |
| DE | 10010722 A1 | | 9/2001 |

(Continued)

*Primary Examiner* — Marcus Charles
(74) *Attorney, Agent, or Firm* — Richard M. Goldberg

(57) ABSTRACT

A bearing arrangement for a steering shaft (10) of a vehicle, having a bearing plate (12) which has an inversion (18) and, at the bottom of the inversion, a bearing seat (14) in which a bearing (16) for the steering shaft (10) is held in such a way that a steering shaft (10) runs obliquely with respect to a plate plane (P) which is defined by the outer edge of the inversion (18), and having an insert (28) which is made from plastic, surrounds the steering shaft (10), and is fitted into the inversion (18), in which the inversion (18) has at least one section (24) with walls which run at right angles with respect to the plate plane (P), and the insert (28) has at least one disk (30, 32) which has a uniform thickness and is fitted into the cross-section of the section (24).

8 Claims, 5 Drawing Sheets

(56) References Cited

U.S. PATENT DOCUMENTS

| | | | | |
|---|---|---|---|---|
| 5,632,562 A * | 5/1997 | Kidzun | ................... | B62D 1/16 384/536 |
| 5,964,536 A * | 10/1999 | Kinoshita | ............... | F16C 33/20 384/441 |
| 6,227,715 B1 * | 5/2001 | Erhardt | ................... | B62D 1/16 384/518 |
| 2002/0121771 A1 * | 9/2002 | Shifflett | ................. | B62D 1/195 280/779 |
| 2006/0199653 A1 | 9/2006 | Terashima | | |
| 2007/0126222 A1 * | 6/2007 | Koya | ..................... | B62D 1/185 280/775 |
| 2010/0242663 A1 * | 9/2010 | Takezawa | ............. | B62D 1/189 74/493 |

FOREIGN PATENT DOCUMENTS

| | | | | | |
|---|---|---|---|---|---|
| DE | 102004040340 A1 * | 2/2006 | | | |
| DE | 102006019574 A1 | 11/2007 | | | |
| DE | WO 2007124840 A1 * | 11/2007 | ............... | B62D 1/16 |
| DE | 102010012875 A1 | 9/2011 | | | |
| DE | 102011004145 A1 | 8/2012 | | | |
| DE | 102014105825 A1 * | 12/2015 | | | |
| EP | 0968900 A1 | 1/2000 | | | |
| FR | EP 0576935 A1 * | 1/1994 | ............... | B62D 1/16 |
| GB | 744086 A * | 2/1956 | ............... | B62D 1/18 |
| GB | 989916 A * | 4/1965 | ............... | B62D 1/16 |
| JP | 54-102725 A | 8/1979 | | | |
| JP | 5-346790 A | 12/1992 | | | |
| JP | 08164860 A * | 6/1996 | | | |
| JP | 8-198122 A | 8/1996 | | | |
| JP | 9-156513 A | 6/1997 | | | |
| JP | 11-334606 | 12/1999 | | | |
| JP | 2002178934 A * | 6/2002 | | | |
| JP | 2003194230 A | 7/2003 | | | |
| JP | 2012255512 A * | 12/2012 | | | |
| KR | 20060110945 A * | 10/2006 | | | |
| KR | 20070005394 A * | 1/2007 | | | |

* cited by examiner

BEARING ARRANGEMENT FOR A STEERING SHAFT

CROSS REFERENCE TO RELATED APPLICATIONS

The present application claims priority as a 371 application of PCT Patent Application No. PCT/EP2014/050740 filed Jan. 15, 2014.

BACKGROUND OF THE INVENTION

The invention relates to a bearing arrangement for a steering shaft of a vehicle, having a bearing plate which has an inversion and, at the bottom of said inversion, a bearing seat in which a bearing for the steering shaft is held in such a way that a steering shaft runs obliquely with respect to a plate plane which is defined by the outer edge of the inversion, and having an insert which is made from plastic, surrounds the steering shaft, and is fitted into the inversion.

By means of such a bearing arrangement the steering shaft of a vehicle is supported at a point where it passes through a body wall that delimits the passenger cabin at the front. Because the steering shaft extends obliquely relative to the plate plane, the inversion has an asymmetric shape, in the past typically the shape of an askew truncated cone. The plastic insert has the purpose to dampen the transmission of sound and vibrations and has so far been formed by a moulded body that fills the hollow space formed by the inversion almost completely.

SUMMARY OF THE INVENTION

It is an object of the invention to provide a bearing arrangement which can be manufactured easily and nevertheless has good sound and vibration dampening properties.

According to one aspect of the invention this object is achieved by the feature that the inversion has at least one section with walls which run at right angles with respect to the plate plane, and the insert has at least one disk which has a uniform thickness and is fitted into the cross-section of said section.

Thus, the insert no more has to be formed in a laborious process in a moulding die, but can simply be formed by a disk that can be cut with the desired contour from a pre-fabricated plate of a suitable material. Since, thus, the plastic material does not have to be mouldable, the material can be optimized in view of the sound and vibration dampening properties. In this way, manufacturing costs are reduced and sound-damping is improved at the same time.

Useful details and further developments of the invention are indicated in the dependent claims.

In a preferred embodiment the insert is formed of foamed plastic.

In a particularly preferred embodiment the insert is formed by at least two disks that are stacked one upon the other and are made of different plastic materials which differ in their acoustic properties, for example by having a different thickness, different pore dimensions and/or a different modulus of elasticity. Thanks to this composite construction of the insert an improved sound dampening is achieved on a larger frequency range because the different plastic materials have their respective maximum damping effect at different frequencies.

According to another aspect of the invention, the insert comprises at least two layers each of which are formed by a disk with a uniform thickness.

It has turned out that the sound damping properties of the bearing arrangement are not degraded but are rather improved when the insert does not match the slanting walls of the inversion everywhere. It is well admitted that empty spaces remain between the insert and the internal surface of the inversion, as long as these are not too large and/or are closed-off on at least one side by the material of the insert. Consequently, when the insert has a multi-layer composition, the adaption to the skewed shape of the inversion may also be achieved by stacking several disks one upon another such that their peripheral edges are offset relative to one another, so that at least a coarse match with the shape of the inversion is achieved. In this case it is also possible to manufacture the insert at low costs from pre-fabricated plate-like material.

Likewise is it possible to form a passage for the steering shaft that runs obliquely through the insert by forming, in each of the individual disks, a bore that runs at right angles to the plane of the disk, but wherein the bores of the different disks are offset relative to one another, such that, together, they form a passage with step-shaped walls for the steering shaft.

According to a useful further development the disks may not only have different peripheral shapes and bores but may also have different thicknesses, and they may in particular be made of materials with different acoustic properties.

BRIEF DESCRIPTION OF THE DRAWINGS

Embodiment examples will now be explained in conjunction with the drawings, wherein.

DETAILED DESCRIPTION

Figure 1:
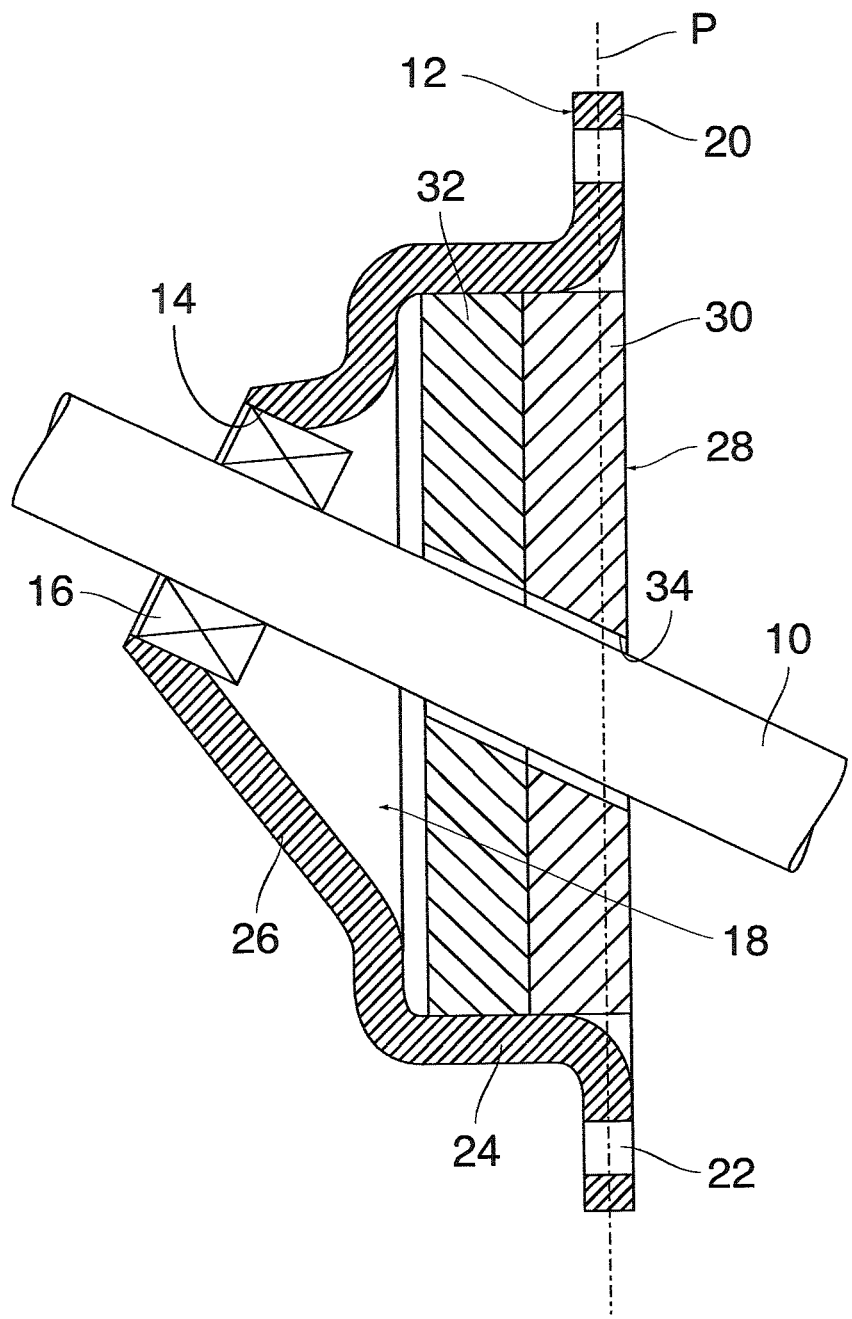
FIG. 1 is a longitudinal section of a bearing arrangement according to the invention.

The bearing arrangement shown in FIG. 1 serves for supporting a steering shaft 10 and has a bearing plate 12 that is made of metal or optionally of plastic and is penetrated by the steering shaft 10 and forms a bearing seat 14 for a bearing 16. At its outer peripheral edge the bearing plate 12 is flat, so that it defines a plate plane P. The bearing seat 14 is however formed at the base of an inversion 18 of the bearing plate that deviates from the plate plane P. On the outer side of the outer periphery of the inversion 18, which outer periphery extends in the plate plane P, the bearing plate 10 has a plurality of mounting tabs 20 with screw holes 22 permitting to mount the bearing plate at a body part that has not been shown.

The inversion 18 is segmented into a cylindrical outer section 24 having a peripheral wall that runs at right angles to the plate plane P, and an inner section 26 that tapers towards the bearing seat 14 in the shape of an askew cone. The bearing 14 is designed such that it holds the bearing 16 in a position in which its axis—and therewith the axis of the steering shaft 10—extends in parallel with the axis of the askew cone and hence obliquely relative to the plate plane P.

The interior of the inversion 18 is filled to a large part by an insert 28 of plastic which improves the sound and vibration damping properties of the bearing arrangement. In the example shown in FIG. 1 the insert 28 is formed by two disks 30, 32 made of foam plastic and laminated one upon the other, which disks differ in their acoustic properties, in particular in their thickness and modulus of elasticity. Optionally, three or more disks may be provided. The disks may be glued to one another or may just be inserted into the cylindrical section 24 of the inversion without being joined to one another.

Foam plastic materials are typically delivered by the manufactures in the form of plates which have different thicknesses. The disks 30, 32 may simply be cut from such plates with the desired peripheral shape (circular in this example). Then, for forming the insert 28, it is only required to form an obliquely extending bore 34 for the steering shaft.

Figure 2:
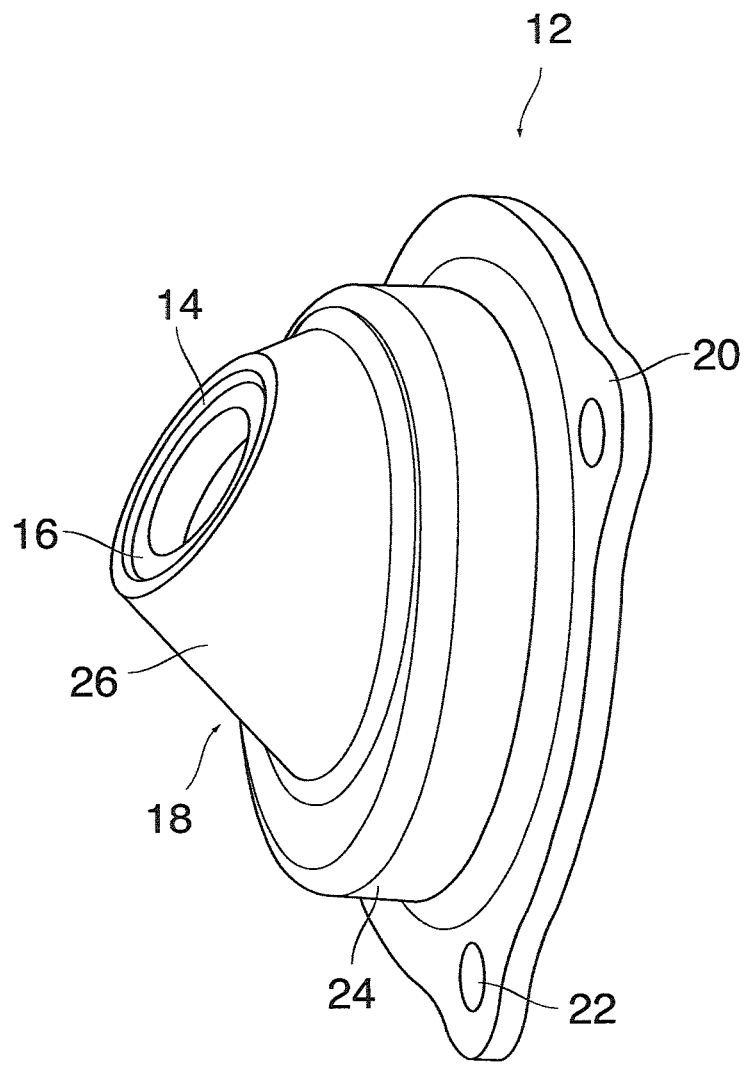
FIG. 2 is a perspective view of a bearing plate and a bearing in the arrangement shown in FIG. 1.

The bearing plate 12, which has been shown in a perspective view in FIG. 2, may for example be formed by a drawn part of sheet metal.

Optionally, the conical part of the inversion 18 which is not filled by the disks 30, 32 in FIG. 1 may be filled with a non-shown moulded plastic part (having a relatively small volume). In another embodiment it is also possible to shape the walls of the inversion such that they surround the steering shaft 10 relatively closely so that practically no hollow space remains in the inversion 18 outside of the cylindrical section 24.

The bore 34 of the disks 30, 32 may optionally accommodate a sleeve that is penetrated by the steering shaft 10 with little play or engages the peripheral surface of the steering shaft with low friction.

Figure 3:
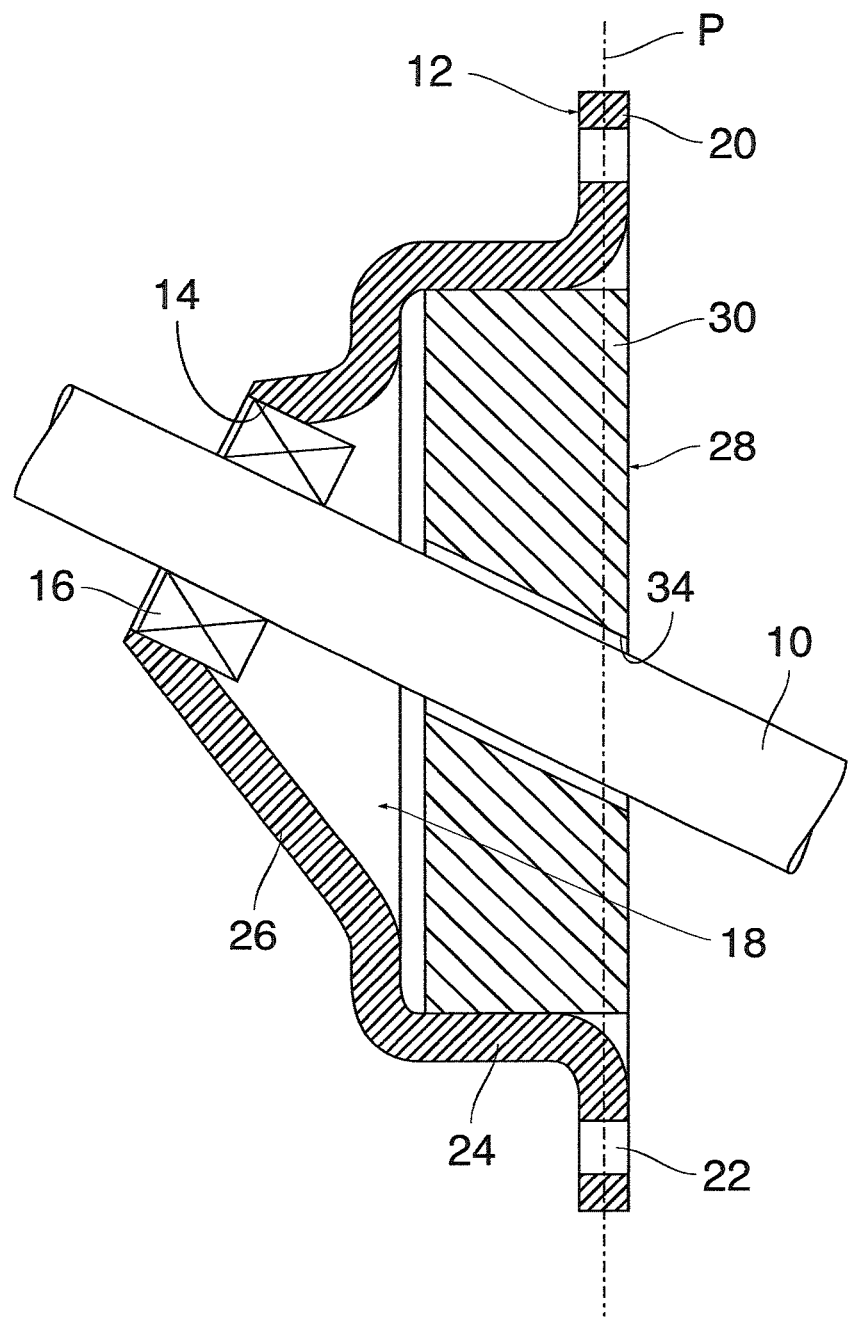
FIGS. 3-5 are longitudinal sections of bearing arrangements according to other embodiments.

FIG. 3 shows a modified embodiment in which the insert 28 is formed by only a single disk 30 of foam plastic.

Figure 4:
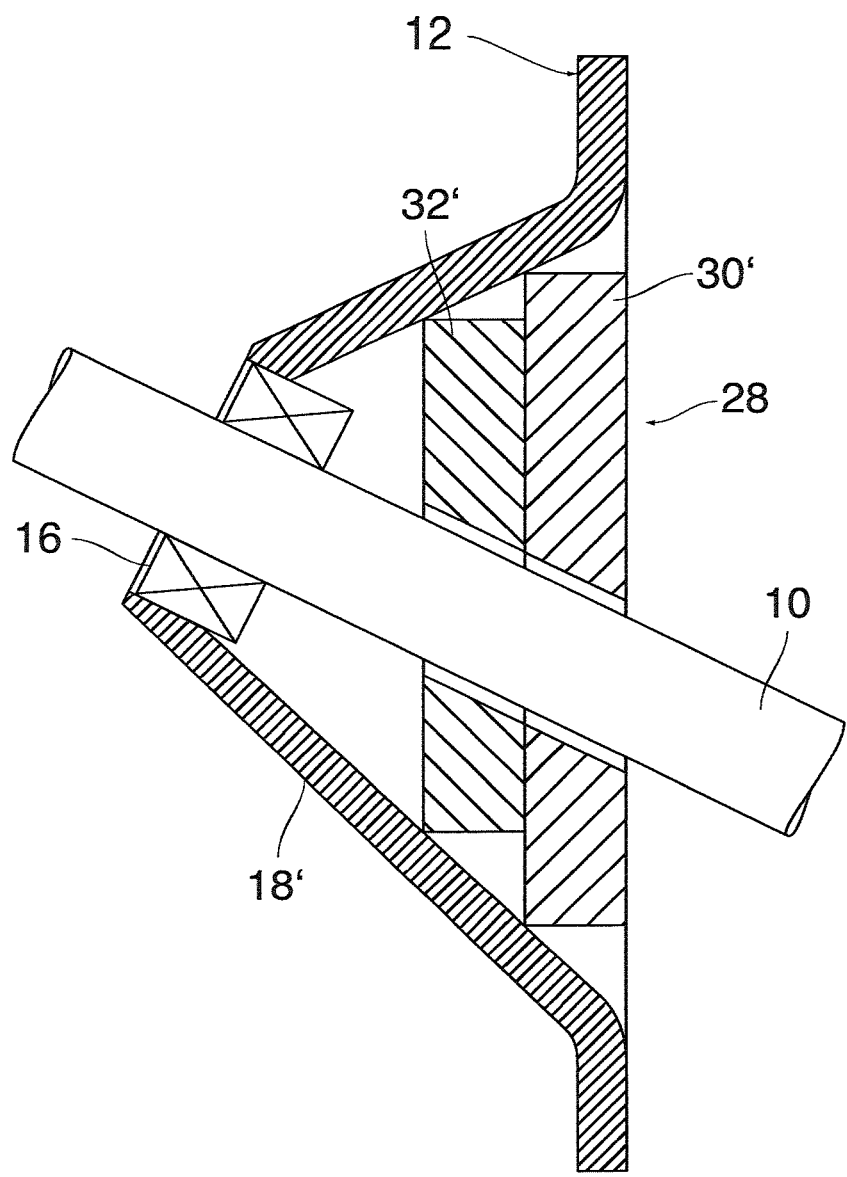

On the other hand, FIG. 4 illustrates an embodiment example in which the insert 28 is formed again by two disks 30', 32', but the inversion, designated as 18' here, has no cylindrical section but is formed in its entirety by an askew truncated cone. In this case, the adaption of the insert 28 to the slanting walls of the inversion is achieved by forming the disks 30' and 32' such that they are not congruent but have different diameters and are offset such that they form a stepped pyramid matching the internal contour of the inversion 18'. In this case, certain gaps remain between the peripheral edges of the disks and the wall of the inversion 18', but it has turned out that these gaps do not compromise but on the contrary improve the sound-damping properties.

Optionally, the disks may also be chamfered at their edges, so that a better match with the shape of the inversion is achieved. This match can also be achieved by slightly pressing the disks into the inversion, so that the compressible material is deformed at the edges.

Figure 5:
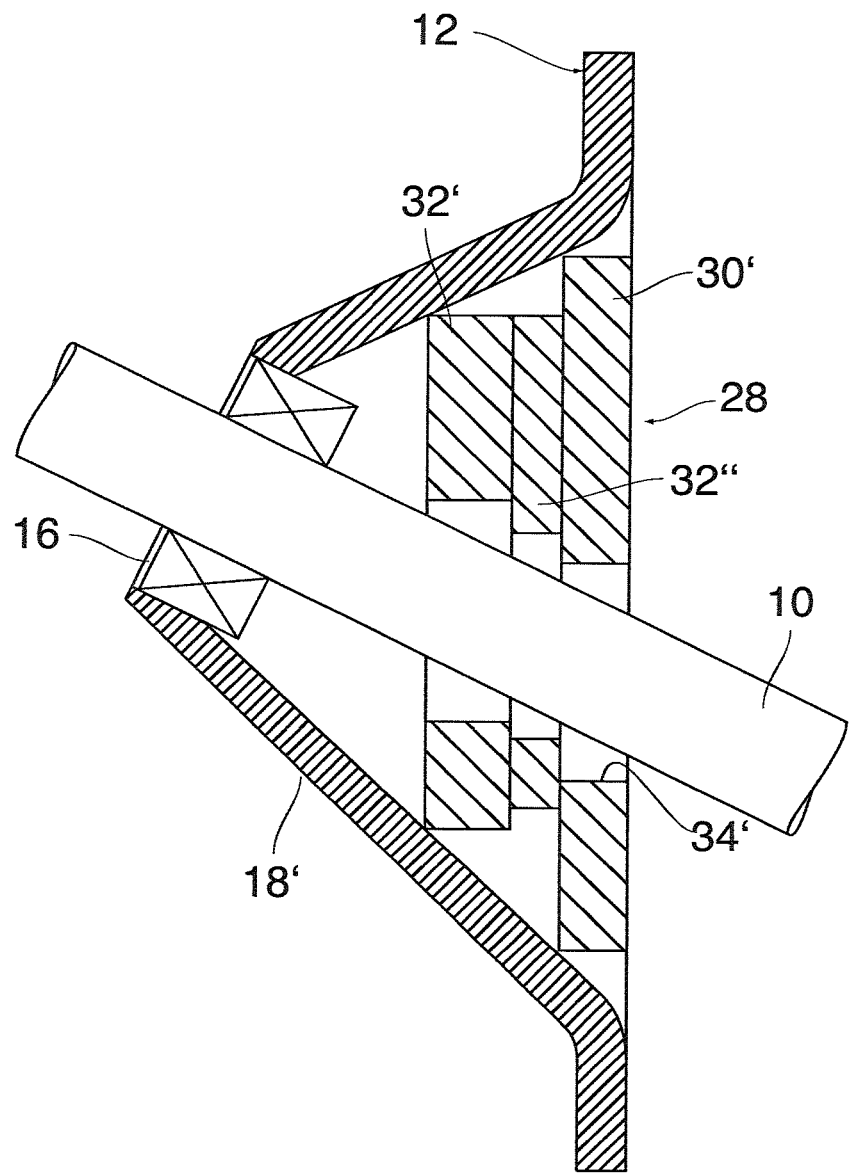

FIG. 5 shows an embodiment example in which the inversion 18' has the same shape as in FIG. 4 and the insert 28 is formed by three disks 30', 32', 32", which differ not only in the diameter but have also different thicknesses. The disk 32" illustrates also the possibility that certain ones of the disks may have a larger distance from the wall of the inversion 18' at their entire periphery.

In this example, the steering shaft 20 passes through bores 34' that run at right angles to the plane of the respective disk, but are offset from one another in accordance with the inclination of the steering shaft 10.

As before, the individual disks may be formed at low costs from plate-like blanks also in this embodiment.

Although the disks have a uniform overall thickness, it is not excluded that the disks are locally compacted and slightly deformed when they are pressed into the inversion.

Just as in the embodiment shown in FIG. 1, the disks may be formed of different materials and may thus have different acoustic properties.

The disks may be glued or welded to one another or may just loosely be stacked one upon the other.

The invention claimed is:

1. A bearing arrangement for a steering shaft of a vehicle, comprising:
    a bearing plate which has an inversion and a bearing seat at a bottom of said inversion,
    a bearing for the steering shaft held in the bearing seat and adapted to hold a steering shaft such that the steering shaft runs obliquely with respect to a plate plane which is defined by an outer edge of the inversion, and
    an insert made from plastic, and adapted to surround the steering shaft, fitted into the inversion,
    wherein the inversion has at least one section with walls which run at right angles with respect to the plate plane and a tapering part connected with the at least one section, and
    wherein the insert has at least one disk which has a uniform thickness and is fitted into a cross-section of said at least one section.

2. The bearing arrangement according to claim 1, wherein the insert comprises at least one disk of foam plastic.

3. The bearing arrangement according to claim 1, wherein the insert is formed by a stack of at least two disks.

4. The bearing arrangement according to claim 3, wherein the disks are formed of plastic materials with different acoustic properties.

5. A bearing arrangement for a steering shaft of a vehicle, comprising:
    a bearing plate which has an inversion and a bearing seat at a bottom of said inversion,
    a bearing for the steering shaft held in the bearing seat, and
    an insert made from plastic, and adapted to surround the steering shaft, fitted into the inversion,
    wherein the insert has at least two layers each is which is formed by a disk with uniform thickness.

6. The bearing arrangement according to claim 5, wherein the disks have different thicknesses.

7. The bearing arrangement according to claim 5, wherein the disks are made of plastic materials with different acoustic properties.

8. A bearing arrangement for a steering shaft of a vehicle, comprising:
    a bearing plate which has an inversion and a bearing seat at a bottom of said inversion,
    a bearing for the steering shaft held in the bearing seat, and
    an insert made from plastic, and adapted to surround the steering shaft, fitted into the inversion,
    wherein the insert has at least two layers each is which is formed by a disk with uniform thickness, and the disks form a stepped pyramid.

* * * * *